United States Patent
Proefke et al.

(10) Patent No.: US 8,547,253 B2
(45) Date of Patent: Oct. 1, 2013

(54) METHOD OF DETERMINING VEHICLE LOCATION FROM KEY FOB

(75) Inventors: David T. Proefke, Madison Heights, MI (US); Clark E. McCall, Ann Arbor, MI (US); William A. Biondo, Beverly Hills, MI (US); Robert V. Lust, Rochester, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1062 days.

(21) Appl. No.: 12/554,150

(22) Filed: Sep. 4, 2009

(65) Prior Publication Data

US 2011/0057817 A1 Mar. 10, 2011

(51) Int. Cl.
*G08G 1/123* (2006.01)

(52) U.S. Cl.
USPC .......................................... 340/989; 340/5.72

(58) Field of Classification Search
USPC .......................................... 340/989, 5.72, 457
See application file for complete search history.

(56) References Cited

U.S. PATENT DOCUMENTS

| 6,696,983 B2 | 2/2004 | Tang et al. |
| 2003/0117267 A1* | 6/2003 | Tang et al. .................... 340/5.72 |
| 2011/0133962 A1* | 6/2011 | King et al. ..................... 340/989 |

OTHER PUBLICATIONS

Chinese Office Action, dated Aug. 2, 2012, for Chinese Patent Application No. 201010274437.6.

* cited by examiner

*Primary Examiner* — Shirley Lu

(74) *Attorney, Agent, or Firm* — Ingrassia Fisher & Lorenz, P.C.

(57) ABSTRACT

A method of indicating a proximity value representative of the distance between a key fob (202) and a vehicle (102) includes transmitting (304, 406, 504) at least one locate signal from the key fob (202) to the vehicle (102), transmitting (364, 468, 562) at least one response signal from the vehicle (102) to the key fob (202) in response to the at least one locate signal, performing (362, 462, 510) RSSI measurements of either the at least one locate signal or the at least one response signal, and displaying (318, 412, 514) the proximity value on the key fob (202) based on the RSSI measurements.

6 Claims, 4 Drawing Sheets

400

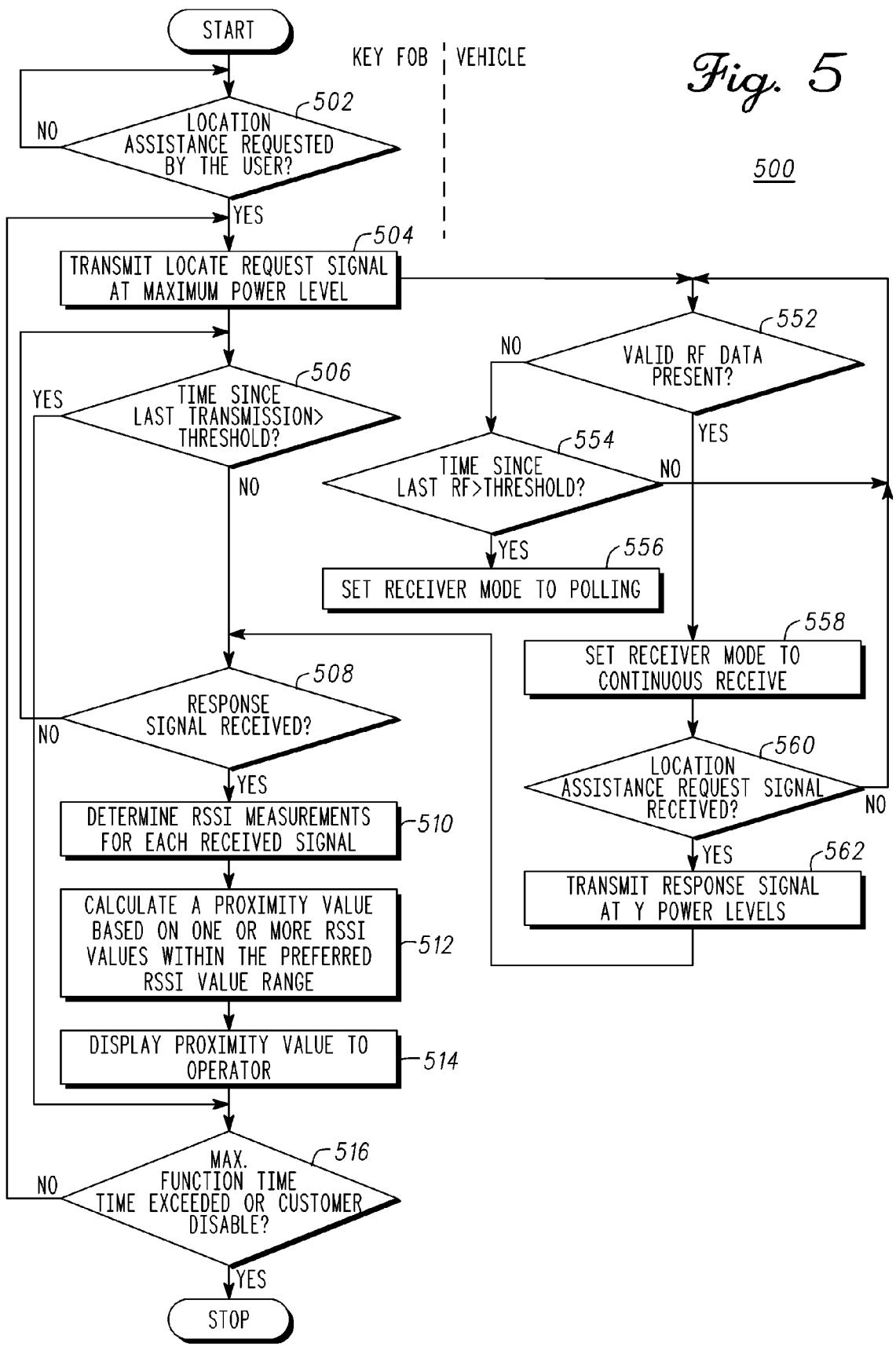

METHOD OF DETERMINING VEHICLE LOCATION FROM KEY FOB

TECHNICAL FIELD

The present invention generally relates to a system for determining the location of a vehicle and more particularly relates to indicating the distance to a vehicle.

BACKGROUND OF THE INVENTION

Key fobs, or remote keyless entry devices, that unlock, for example, the driver's door, passenger doors, or the trunk lid are well known. Some key fobs control other user preferred features such as seat position, radio station, and air control temperature settings. Many key fobs are manually activated by the user (active approach) as the vehicle is approached. Other key fobs transmit a signal in response to a low frequency query from the vehicle (passive approach), with the key fob signal being detected by the vehicle for activating the desired features. Yet other known key fobs, when unlocking or locking the doors of the vehicle, will cause an audible sound to be emitted from the vehicle and/or various lights on the vehicle to be illuminated.

However, these known devices require the user be within a certain distance of the vehicle prior to use and generally within sight of the vehicle. If the user of the vehicle does not know or remember the location of the vehicle, which may be parked in a parking lot at a mall or sporting event, for example, these known devices are of limited benefit.

Accordingly, it is desirable to provide a system that assists the user to find the vehicle by actively determining the distance to the vehicle. Furthermore, other desirable features and characteristics of the present invention will become apparent from the subsequent detailed description and the appended claims, taken in conjunction with the accompanying drawings and the foregoing technical field and background.

SUMMARY OF THE INVENTION

A method of indicating a proximity value representative of the distance between a key fob and a vehicle includes transmitting at least one locate signal from the key fob to the vehicle, transmitting at least one response signal from the vehicle to the key fob in response to the at least one locate signal, performing Received Signal Strength Indication (RSSI) measurements of either the at least one locate signal or the at least one response signal, and displaying the proximity value on the key fob based on the RSSI measurements.

In another exemplary embodiment, a method of indicating the distance between a key fob and a vehicle includes transmitting a locate signal from the key fob, receiving a response signal from the vehicle, and displaying the indicated distance based on RSSI measurements of one of the locate signal and the response signal. Multiple transmissions of locate signals may be made at various power levels.

In yet another exemplary embodiment, a method of indicating the distance between a key fob and a vehicle includes receiving a locate signal by the vehicle transmitted from the key fob, and transmitting a plurality of signals from the vehicle to the key fob in response to receiving the locate signal, the distance indication being derived from the plurality of signals.

DESCRIPTION OF THE DRAWINGS

The present invention will hereinafter be described in conjunction with the following drawing figures, wherein like numerals denote like elements.

FIG. 5 is a flow chart of a method in accordance with a third exemplary embodiment for use in the vehicle system of FIG. 1 and the key fob of FIG. 2.

DETAILED DESCRIPTION OF THE INVENTION

Figure 1:
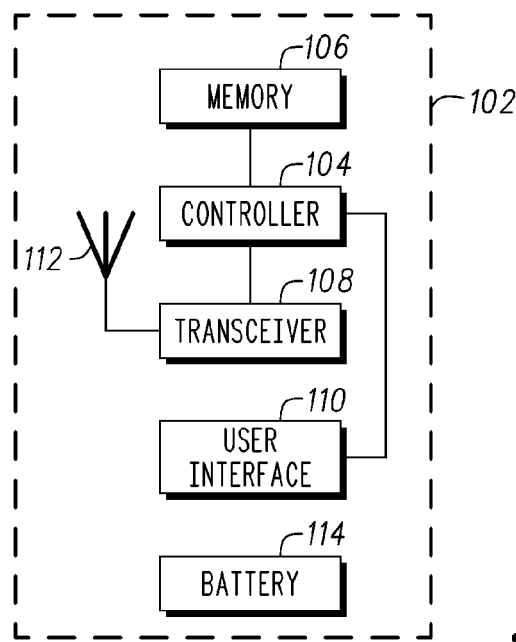
FIG. 1 is a block diagram of a vehicle system for implementing the exemplary embodiment.

The following detailed description of the invention is merely exemplary in nature and is not intended to limit the invention or the application and uses of the invention. Furthermore, there is no intention to be bound by any expressed or implied theory presented in the preceding technical field, background, brief summary or the following detailed description.

The method disclosed herein allows the user of a vehicle, by activation of a feature of a key fob, to determine a proximity value indicating an approximate distance to the vehicle. Feedback is delivered to the user via a display built-in to the key fob. This feedback assists the user in returning to his/her vehicle when the location of the parked vehicle is unknown.

In order to reduce "noise" sources, such as signal strength being affected by nearby buildings, vehicles, open space versus obstructions, an algorithm processes signal strength to extract useful information for display to the user.

A first exemplary embodiment has three aspects. First, a rolling median value of sampled signal strength data points is calculated to insure the exclusion of data anomalies. Second, data trends are monitored in order to ignore non-realistic data values. Third, signal transmissions are processed from both the vehicle and the key fob. The first aspect of the algorithm uses median values of captured data samples to ignore outlying data values. The number of data samples can be configured to suit the data sample rate. The second aspect of the algorithm rejects data samples that exceed a maximum rate of change, for example, the distance to the vehicle may not change faster than the rate at which a user can walk. The third aspect of the algorithm uses the received signal strength at both the key fob and the vehicle for further extracting the desired signal from noise.

This first exemplary embodiment may optionally use compass heading information and three dimensional accelerometer data for the key fob and vehicle as inputs to an algorithm that determines the most appropriate information to display to the user as an aid in returning to the vehicle. This information and data will provide awareness as to when the user has stopped movement, changed direction, or changes orientation of the key fob, all of which may be processed by the algorithm to provide more accurate data.

A second exemplary embodiment overcomes non-linearity of the signal strength, e.g., Received Signal Strength Indication (RSSI), signals at various distances and power levels. Since the measured signal strength may change significantly for small changes in distance between the key fob and the vehicle, or one of the transceivers may saturate and no longer provide signal strength information that can be used to determine changes in distance between the key fob and the vehicle, the transmit power of the locate request is dynamically managed to maintain operation within a range of RSSI values representing approximately the center one-third of the total range. Upon receipt of the locate request signal, the RSSI value is evaluated against predefined thresholds (e.g. one-third and two-thirds of the total RSSI range). If the RSSI value is less than the first threshold, the preferred power level for the next transmission will be increased from the prior level. If the RSSI value is greater than the second threshold, the preferred power level for the next transmission will be decreased from the prior level.

A third exemplary embodiment transmits multiple power transmission levels and determines an RSSI level which remains in a more linear range of operation for a greater range of distances between the key fob and the vehicle, thereby preventing saturation of the RSSI signal (which is non-linear in nature) as the transmitter (key fob) approaches the receiver (vehicle) while having more variation when the transmitter is further from the vehicle.

Referring to FIG. 1, a vehicle system 102 includes a controller 104 coupled to each of a memory 106, a transceiver 108, and a user interface 110. The vehicle may be any transportation device, but is an automobile in the exemplary embodiment discussed herein. The controller 104 preferably is a microprocessor, but may be other types of circuitry such as application specific integrated circuits or discrete logic. The memory 106 is any memory capable of storing information, but preferably is ROM, Flash, or RAM and may be or not be combined with the controller 104. The transceiver 108, and an antenna 112 coupled thereto, are capable of transmitting and receiving in any one of numerous RF ranges. The range of 900 MHz to 920 MHz is preferred for the exemplary embodiment. The antenna 112 preferably is positioned within the vehicle, but may be positioned on the outside of the vehicle. The user interface 110 may be a device in which the user provides information to the controller 104, but also may be settings registered by sensors disposed in various vehicle devices, for example, the position of the driver's seat or the mirrors, and a preferred radio station. Some features, such as approach lighting, may be automatically selected and need not be input by the user to the user interface 110. For example, when activated, the approach lighting may include one or more of interior lighting, door handle lights, fog lights, mirror mounted puddle lights, and reverse (back up) lights. A battery 114, which may be the vehicle's main battery, is provided to supply power to each of the controller 104, memory 106, transceiver 108, and user interface 110.

Figure 2:
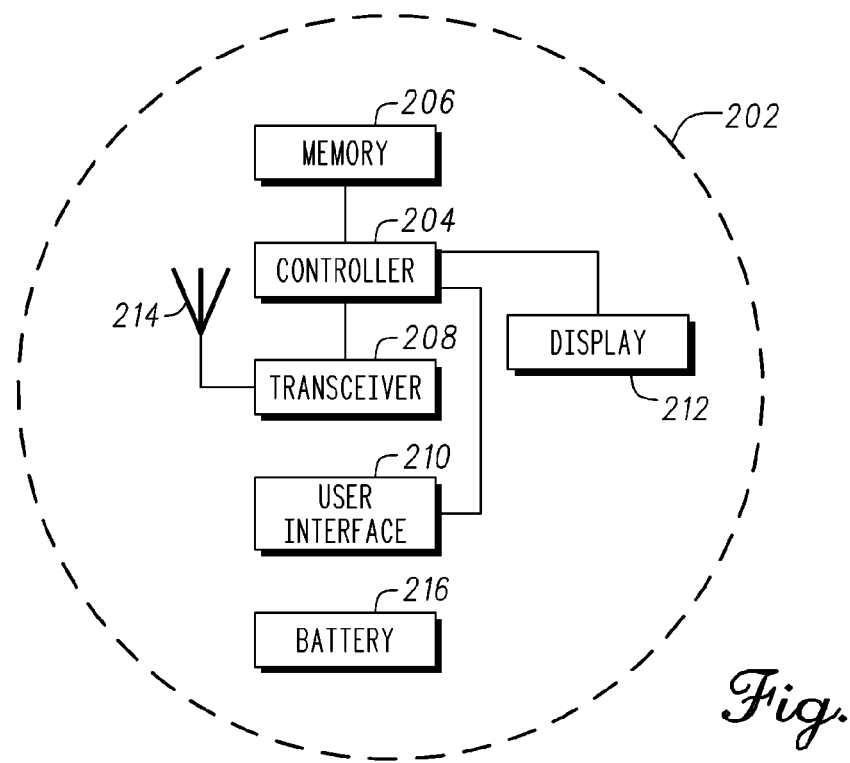
FIG. 2 is a block diagram of a key fob for implementing the exemplary embodiment.

A key fob 202 shown in FIG. 2 includes a controller 204, a memory 206, a transceiver 208, a user interface 210, and a display 212. The key fob 202 may be of any shape and may have a door and/or an ignition key integrated therewith. The controller 204 preferably is a microprocessor, but may be other types of circuitry such as application specific integrated circuits or discrete logic. The memory 206 preferably is ROM, Flash, or RAM and may be or not be combined with the controller 204. The transceiver 208, and an antenna 214 coupled thereto, are capable of transmitting and receiving in any one of numerous RF ranges. The RF range of 900 MHz to 920 MHz is preferred for the exemplary embodiment. The optional user interface 210 includes a switch for activating the finder features on the key fob and the vehicle. The display 212 may be a liquid crystal display, a touch screen, or any other type of display known or developed in the future. A battery 216, which may be rechargeable and/or of fixed capacity, is provided to supply power to each of the controller 204, memory 206, transceiver 208, user interface 210, and display 212.

Figure 3:
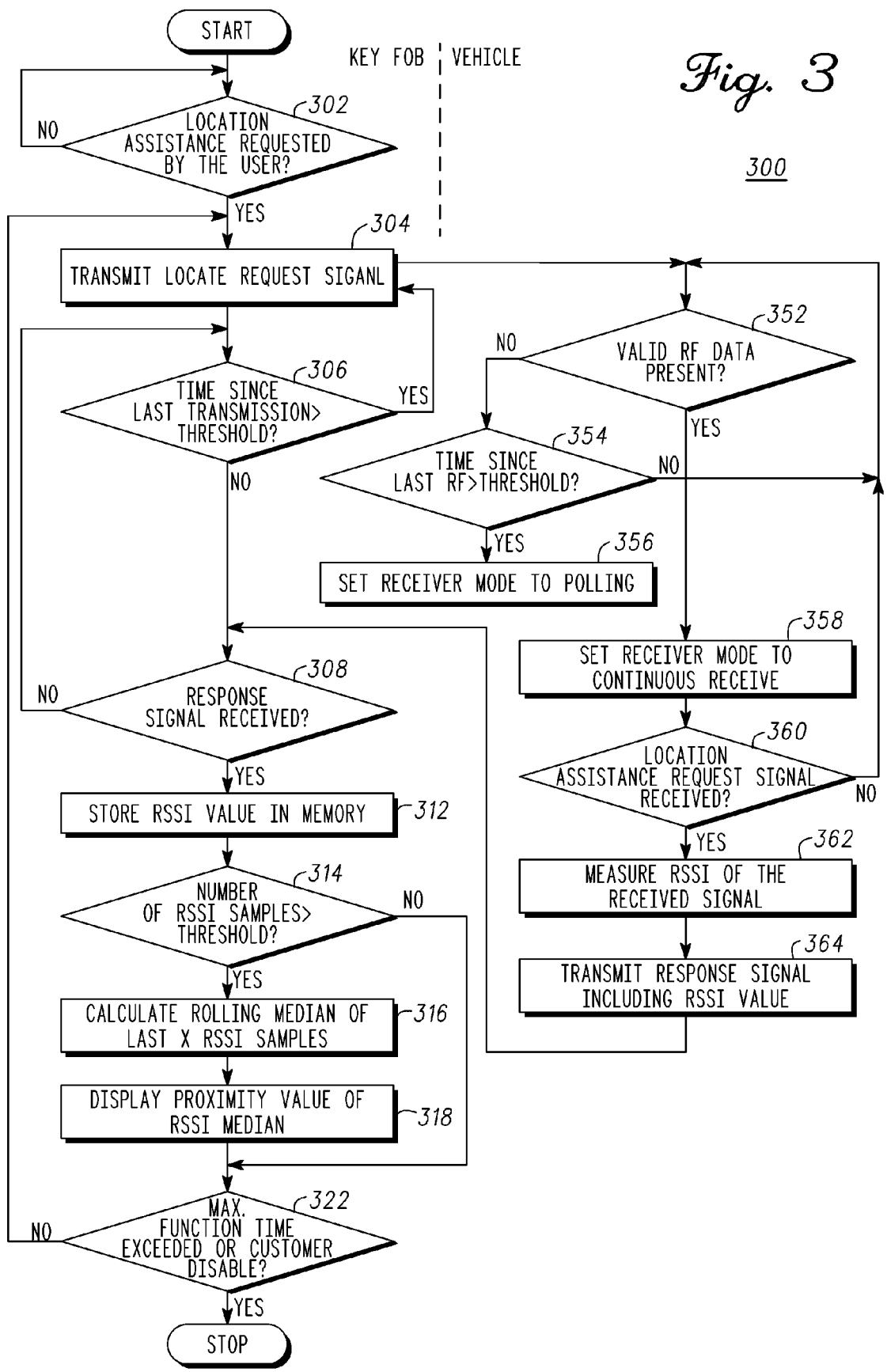
FIG. 3 is a flow chart of a method in accordance with a first exemplary embodiment for use in the vehicle system of FIG. 1 and the key fob of FIG. 2.

Referring to FIG. 3, the method 300 of the first exemplary embodiment shows steps taken within the key fob on the left and steps taken within the vehicle on the right. The method 300 includes determining if a request 302 for an indication (proximity value) of the distance from the key fob 202 to the vehicle 102 has been made by the user by activating a feature on the user interface 210. If yes, a locate signal is transmitted 304 from the key fob 202. A locate signal contains header information and a format that is specific to the finder message and contains an identification which has been matched/programmed to the vehicle. A determination is made 306 whether the time since the last transmission of the locate signal has exceeded a first threshold without a response being received. An example of this first threshold is 500 milliseconds. If the time has exceeded the threshold, step 304 is repeated.

Referring to the vehicle side of FIG. 3, if valid RF data is not present 352 and a time threshold has passed 354, the vehicle receiver is set 356 to a polling mode. If there is valid RF data present 352, the vehicle receiver is set 358 to a continuous receive mode. If the valid RF data is not the locate signal 360, step 352 is repeated. If it is the locate signal 360, the RSSI of the locate signal is measured 362 and a response signal including the RSSI value is transmitted 364.

If this response signal is received 308 at the key fob, the RSSI information from the received response signal is stored 312 within the memory 206. The response signal strength may be, for example, 127 for an 8 bit RSSI signal. Signal strength is typically reported by most receivers as an A/D output level. The specific signal strength will ultimately depend on receiver sensitivity, antenna gain, and vehicle mounting location. If the number of RSSI samples received does exceed 314 a second threshold, fifty for example, a rolling median value of a predetermined number of the RSSI samples is calculated 316 and the proximity value (distance between the key fob 202 and the vehicle 102) is displayed 318 on the display 212. The proximity value may be represented in several ways. For example, a number from 1 to 10 may be displayed wherein 1 means the key fob 202 is close to the vehicle 102, and 10 means it is far away. Other examples include a bar partially highlighted depending on the distance, and a plurality of icons in which the number of icons illustrated indicate the relative distance. A determination is made whether a function time exceeds a third threshold. If no, step 304 is repeated, otherwise the program is ended.

Figure 4:
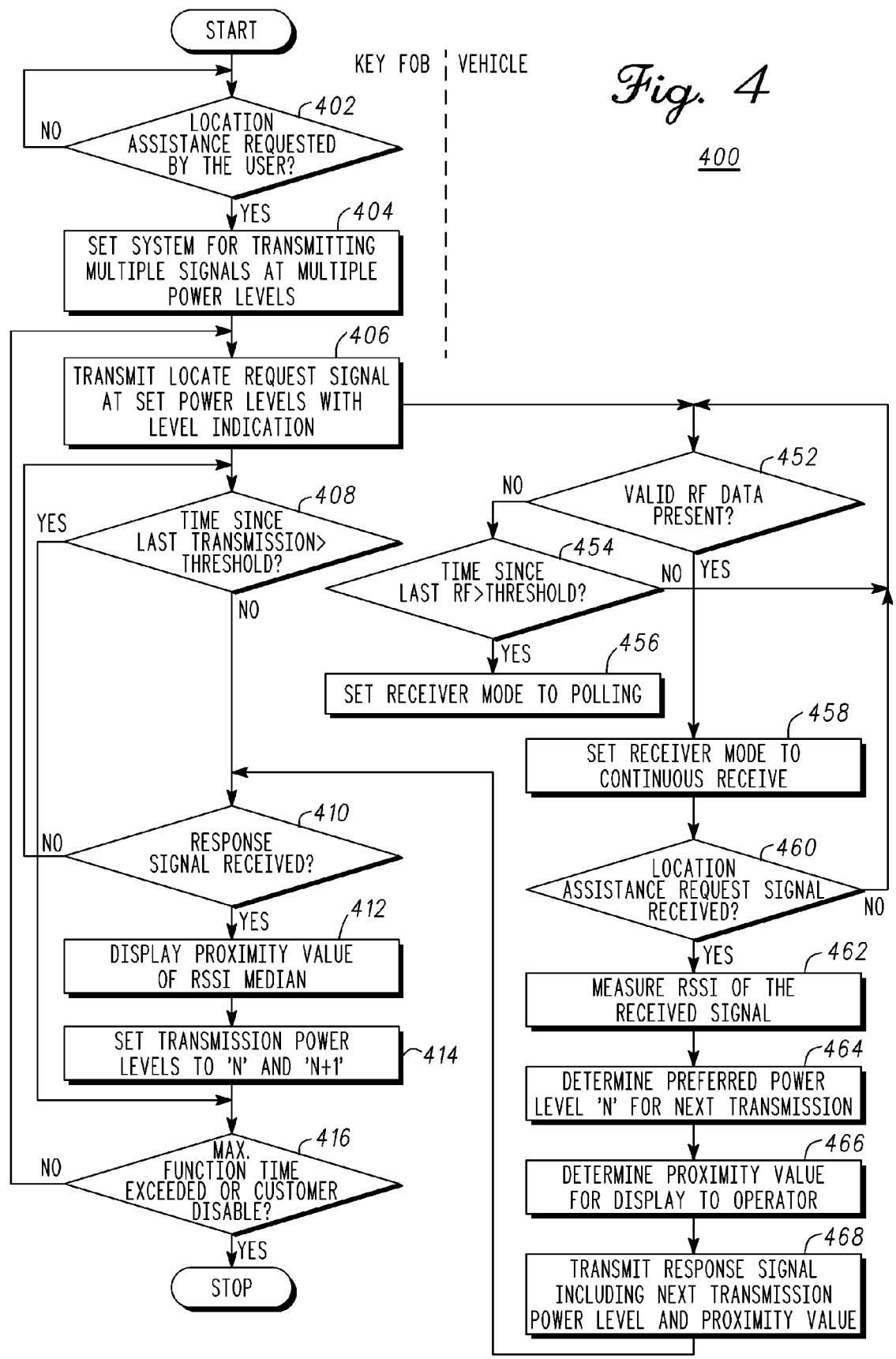
FIG. 4 is a flow chart of a method in accordance with a second exemplary embodiment for use in the vehicle system of FIG. 1 and the key fob of FIG. 2.

Referring to FIG. 4, the method 400 of a second exemplary embodiment shows steps taken within the key fob on the left and steps taken within the vehicle on the right. The method 400 includes determining if a request 402 for an indication (proximity value) of the distance from the key fob 202 to the vehicle 102 has been made by the user by activating a feature on the user interface 210. If yes, the key fob system is set 404 for transmitting multiple signals, each having a different power level. A locate signal is transmitted 406 with set power levels and level indications.

Referring to the vehicle side of FIG. 4, if valid RF data is not present 452 and a time threshold has passed 454, the vehicle receiver is set 456 to a polling mode. If there is valid RF data present 452, the vehicle receiver is set 458 to a continuous receive mode. If the valid RF data is not the locate signal 460, step 452 is repeated. If it is the locate signal 460, the RSSI of the locate signal is measured 462 and a preferred power level "N" is determined 464 for the next transmission. Upon receipt of the locate request signal, the RSSI value is evaluated against predefined thresholds, e.g., one-third and two-thirds of the total RSSI range. If the RSSI value is less than the first threshold, the preferred power level for the next transmission will be increased from the prior level. If the RSSI value is greater than the second threshold, the preferred power level for the next transmission will be decreased from the prior level. The vehicle processor then determines 466 the proximity value to be displayed on the key fob and transmits 468 a response signal including the next transmission power level and the proximity value.

At the key fob, if the time since the last transmission has not exceeded 408 a threshold and the response signal is received 410 from the vehicle, the proximity value of the RSSI median is displayed 412 at the key fob and the transmission power levels are set 414 to N and N+1. If the function time has not exceeded 416 a threshold or the user has not disabled the key fob, step 406 is repeated, otherwise the program is ended.

The method 500 of a third exemplary embodiment is shown in FIG. 5 and shows steps taken within the key fob on the left and steps taken within the vehicle on the right and includes determining if a request 502 for an indication (proximity value) of the distance from the key fob 202 to the vehicle 102 has been made by the user by activating a feature on the user interface 210. If yes, a locate signal is transmitted 504 at maximum power from the key fob 202. A locate signal contains header information and a format that is specific to the finder message and contains an identification which has been matched/programmed to the vehicle.

Referring to the vehicle side of FIG. 5, if valid RF data is not present 552 and a time threshold has passed 554, the vehicle receiver is set 556 to a polling mode. If there is valid RF data present 552, the vehicle receiver is set 558 to a continuous receive mode. If the valid RF data is not the locate signal 560, step 552 is repeated. If it is the locate signal 560, a response signal is transmitted 562 at a plurality of power levels.

If this response signal is received 508 at the key fob, RSSI measurements for each response signal are determined and recorded 510. A proximity value is calculated 512 based on one or more RSSI values within a preferred RSSI value range and displayed 514. If a function time has not exceeded 516 a threshold and the user has not disabled the key fob, step 504 is repeated, otherwise, the program is ended.

A method has been disclosed herein of indicating a proximity value representative of the distance between a key fob and a vehicle. Processing the RSSI of the signal from the key fob reduces errors caused by noise sources. A rolling median value of sampled data points is calculated to insure the exclusion of data anomalies. Data trends are monitored in order to ignore non-realistic data values. The transmitted signals to and from the key fob may both be processed.

The method includes transmitting at least one locate signal from the key fob to the vehicle, transmitting at least one response signal from the vehicle to the key fob in response to the at least one locate signal, performing RSSI measurements of either the at least one locate signal or the at least one response signal, and displaying the proximity value on the key fob based on the RSSI measurements.

In one exemplary embodiment, a method of indicating a proximity value representative of the distance between a key fob and a vehicle, includes a) transmitting a locate signal from the key fob to the vehicle, b) transmitting a response signal from the vehicle to the key fob in response to the locate signal, c) performing RSSI measurements of the response signal, d) determining a median of the RSSI measurements, e) displaying a proximity value based on the median, and f) transmitting another locate signal and returning to step b.

In another exemplary embodiment, a method of indicating the distance between a key fob and a vehicle, includes a) the key fob setting the number of transmission strengths to a pre-determined number of levels each with a unique signal strength, b) transmitting a locate signal from the key fob to the vehicle at the identified multiple power levels, c) performing RSSI measurements at the vehicle for the received signals, d) determining at the vehicle the proximity value for display to the operator, e) determining at the vehicle the power level N that is most optimal for distinguishing proximity using received signal strength, f) transmitting from the vehicle the transmit power level N for the next key fob transmission along with the RSSI value and proximity display value, g) displaying an N proximity value based on the RSSI measurements on the key fob, and h) setting the key fob transmission power levels to the value N received from the vehicle and the next higher level N+1 and returning to step b.

In yet another exemplary embodiment, a method of indicating the distance between a key fob and a vehicle, comprising a) transmitting a locate signal from the key fob to the vehicle, b) transmitting from the vehicle response signals having N power levels, c) performing RSSI measurements at the key fob for the signals, d) calculating a proximity value for one or more of the RSSI measurements that is most optimal for distinguishing proximity using received signal strength (e.g. within the middle of the available RSSI value range for a given receiver, that is ignoring the signals resulting from power levels at either extreme of the RSSI range where in one case minimal changes in distance result in excessive change in RSSI and in the other case large changes in distance result in minimal change in RSSI), e) displaying a proximity value based on the RSSI measurements, and f) returning to step a.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way, including embodiments representing a combination of any or all of the aforementioned embodiments. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A method of indicating a proximity value representative of the distance between a key fob system and a vehicle system, comprising:

transmitting an N plurality of locate signals from the key fob, each of the N plurality of locate signals having a different signal strength;

performing RSSI measurements for the N plurality of locate signals received by the vehicle system;

determining a proximity value by the vehicle system based on the N plurality of locate signals received;

determining by the vehicle system the power level optimal for distinguishing proximity using the signal strength of the N received locate signals;

transmitting from the vehicle system the transmit power level for the next key fob transmission along with the RSSI value and the proximity value;

displaying a proximity value on the key based on RSSI measurements;

setting the key fob system transmission power signal strengths of an N+1 plurality of locate signals to that received from the vehicle system and a level greater than that received from the vehicle system; and transmitting the N+1 plurality of locate signals from the key fob system, each of the N+1 plurality of locate signals having a different signal strength.

2. The method of claim 1 further comprising repeating each of the steps in succession a plurality of times.

3. The method of claim 1 further comprising calculating the proximity value based on at least one of the RSSI values within a preferred range of RSSI values.

4. The method of claim 3 further comprising repeating each of the steps a plurality of times in succession.

5. The method of claim 4 wherein the performing step comprises rejecting RSSI measurements that exceed a maximum rate of change.

6. An apparatus for indicating a proximity value representative of the distance between a key fob system and a vehicle system, comprising:
  the key fob system configured for transmitting an N plurality of locate signals to the vehicle system, each of the N plurality of locate signals having a different signal strength
  the vehicle system configured to:
    perform RSSI measurements of the N plurality of locate signals received by the vehicle system;
    determine a proximity value based on the N plurality of locate signals received;
    determine the power level optimal for distinguishing proximity using the signal strength of the N received locate signals;
    transmit the transmit power level for the next key fob transmission along with the RSSI value and the proximity value; and
  a display on the key fob configured for displaying the proximity value based on RSSI measurements;
  wherein the key fob system is further configured to:
    set the key fob system transmission power signal strengths of an N+1 plurality of locate signals to that received from the vehicle system and a level greater than that received from the vehicle system; and
    transmitting the N+1 plurality of locate signals from the key fob system, each of the N+1 plurality of locate signals having a different signal strength.

* * * * *